(12) United States Patent
Lee et al.

(10) Patent No.: US 11,364,548 B2
(45) Date of Patent: Jun. 21, 2022

(54) GRIPPER MODULE

(71) Applicant: Agile Wing Smart Manufacturing Co., Ltd., Taichung (TW)

(72) Inventors: Hung-Wu Lee, Taichung (TW); Yong-Lin Chen, Taichung (TW); Ying-Chih Lin, Taichung (TW)

(73) Assignee: Agile Wing Smart Manufacturing Co., Ltd., Taichung (TW)

( * ) Notice: Subject to any disclaimer, the term of this patent is extended or adjusted under 35 U.S.C. 154(b) by 46 days.

(21) Appl. No.: 17/014,105

(22) Filed: Sep. 8, 2020

(65) Prior Publication Data
US 2021/0220926 A1 Jul. 22, 2021

(30) Foreign Application Priority Data
Jan. 17, 2020 (TW) .................... 109101798

(51) Int. Cl.
*B23B 31/26* (2006.01)
*B23B 31/20* (2006.01)
(52) U.S. Cl.
CPC ........ *B23B 31/2073* (2021.01); *B23B 31/265* (2013.01); *B23B 31/202* (2013.01)
(58) Field of Classification Search
CPC ............. B23B 31/2073; B23B 31/202; B23B 31/16183; B23B 31/16191; B23B 31/204; B23B 31/207; B23B 31/2072; B23B 31/261; B23B 31/265; B23B 31/4006; B23B 31/4026; B23B 31/406; B23B 31/4066; B23B 31/4033; B23B 2231/04; Y10T 279/1258; Y10T 279/17598; Y10T 279/17367; Y10T 279/17461; Y10T 279/17529; Y10T 279/1012; Y10T 279/1045; Y10T 279/1083;
(Continued)

(56) References Cited

U.S. PATENT DOCUMENTS

| | | | |
|---|---|---|---|
| 4,867,463 | A | 9/1989 | Hopf |
| 5,096,213 | A | 3/1992 | Terwilliger et al. |
| 6,224,067 | B1 | 5/2001 | Lindstrom |

(Continued)

FOREIGN PATENT DOCUMENTS

| DE | 10118664 A1 * | 11/2002 | ............ B23Q 3/183 |
|---|---|---|---|
| DE | 102016116664 A1 | 3/2018 | |

(Continued)

*Primary Examiner* — Chwen-Wei Su
(74) *Attorney, Agent, or Firm* — Karin L. Williams; Alan D. Kamrath; Mayer & Williams PC (57) ABSTRACT

The present disclosure provides a gripper module, including a base, an adapter holder, a collet holder, and an actuator. The base is adapted for an adapter to be detachably disposed thereon. The adapter holder is able to engage and to buckle the adapter. The collet holder is able to engage and to buckle a collet which is installed in the adapter. The actuator is connected to the collet holder. The actuator can pull the collet holder and the collet to move, causing pressing and retraction of the collet by the conical surface between the collet and the adapter. Therefore, sizes of collets may apply to the gripper module with the adapter. By sheathing the adapter, replacement and size alternation of the collets are made easier, and precisions of allocations of the collet and the gripped workpiece are improved.

10 Claims, 10 Drawing Sheets

(58) Field of Classification Search
CPC ....... Y10T 279/1087; Y10T 279/17351; Y10T 279/29; Y10T 279/1008; Y10T 409/309464
See application file for complete search history.

(56) References Cited

U.S. PATENT DOCUMENTS

| | | | |
|---|---|---|---|
| 6,419,430 B2 * | 7/2002 | Hangleiter | B23B 31/261 |
| | | | 279/137 |
| 6,554,288 B2 * | 4/2003 | Tomoni | B23B 31/202 |
| | | | 279/143 |
| 8,556,554 B2 * | 10/2013 | Hangleiter | B23B 31/265 |
| | | | 409/233 |
| 9,248,508 B2 * | 2/2016 | Motschi | B23B 31/36 |

FOREIGN PATENT DOCUMENTS

| | | | | |
|---|---|---|---|---|
| FR | 2242196 A1 * | 3/1975 | ........... | B23B 31/207 |
| TW | 200408478 A | 6/2004 | | |
| TW | 200603924 A | 2/2006 | | |
| TW | M323945 U | 12/2007 | | |
| TW | 201026431 A | 7/2010 | | |

* cited by examiner

GRIPPER MODULE

FIELD OF THE INVENTION

The present disclosure relates to a gripper module for machining in order to clamp a workpiece or a cutter for processing.

BACKGROUND OF THE INVENTION

A gripper module used to hold the cutter or the workpiece is common in machining. Some gripper modules have conical surfaces abutting against the cylinder holder or the clamping head in order to fasten the cylinder holder or the clamping head to clamp the cutter or the workpiece, as shown in the patent publication TW200408478. Patent TW M323945 also disclosed similar structures.

However, the gripper module mentioned above is difficult to be applied to workpieces in various sizes. For example, to be applied to the workpieces in different sizes, the clamping head of TW200408478 has to be replaced with the ones in different sizes. In addition, the clamping tube outside the clamping head may have to be replaced too. However, the clamping tube is fixed by the bolts. When replacing the clamping tube, calibration of the clamping tube is needed. Thus, the cost is increased, and the precision is reduced.

The present invention is, therefore, arisen to obviate or at least mitigate the above mentioned disadvantages.

SUMMARY OF THE INVENTION

One of the objects of the present invention is to provide an improved gripper module which is suitable for workpieces in various sizes.

To achieve the above and other objects, the present invention provides a gripper module adapted for an adapter and a collet to connect with. The collet is adapted for clamping a workpiece. The adapter has an axial hole. The collet is detachably inserted into the axial hole. The collect encloses a clamping opening. The gripper module includes a base, an adapter holder, a collet holder, and an actuator. The base has a receiving room. The receiving room has an opening. The receiving room defines an axis and an opening direction. The receiving room is adapted for the adapter to detachably insert into via the opening. The axial hole expands along the opening direction when the adapter is inserted into the receiving room. The adapter holder is received in the receiving room and holds the adapter selectively so that the adapter is positioned in the receiving room. The collet holder is received in the receiving room and holds the collet so that the collet is positioned in the axial hole. The actuator is disposed on the base and connected to the collet holder. The actuator drives the collet holder to move along a direction opposite to the opening direction so as to drive the collet to move along a direction opposite to the opening direction and to fasten the collet into the clamping opening due to the axial hole.

Thereby, the collet can be held or released by the collet holder. Thus, the collet can be easily removed and replaced with collets in various sizes in order to hold workpieces in various sizes. In addition, the precision of rotation is improved.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

The present disclosure can be more fully understood by reading the following detailed description of the embodiment, with reference made to the accompanying drawings as follows.

DETAILED DESCRIPTION OF THE PREFERRED EMBODIMENTS

The present invention provides a gripper module for a processing machine. The gripper module is used to hold the cutter or the workpiece to process. Please refer to FIG. 2 to FIG. 5, the gripper module includes a base, an adapter 20, an adapter holder, a collet 40, an actuator, and a collet holder.

Figure 1:
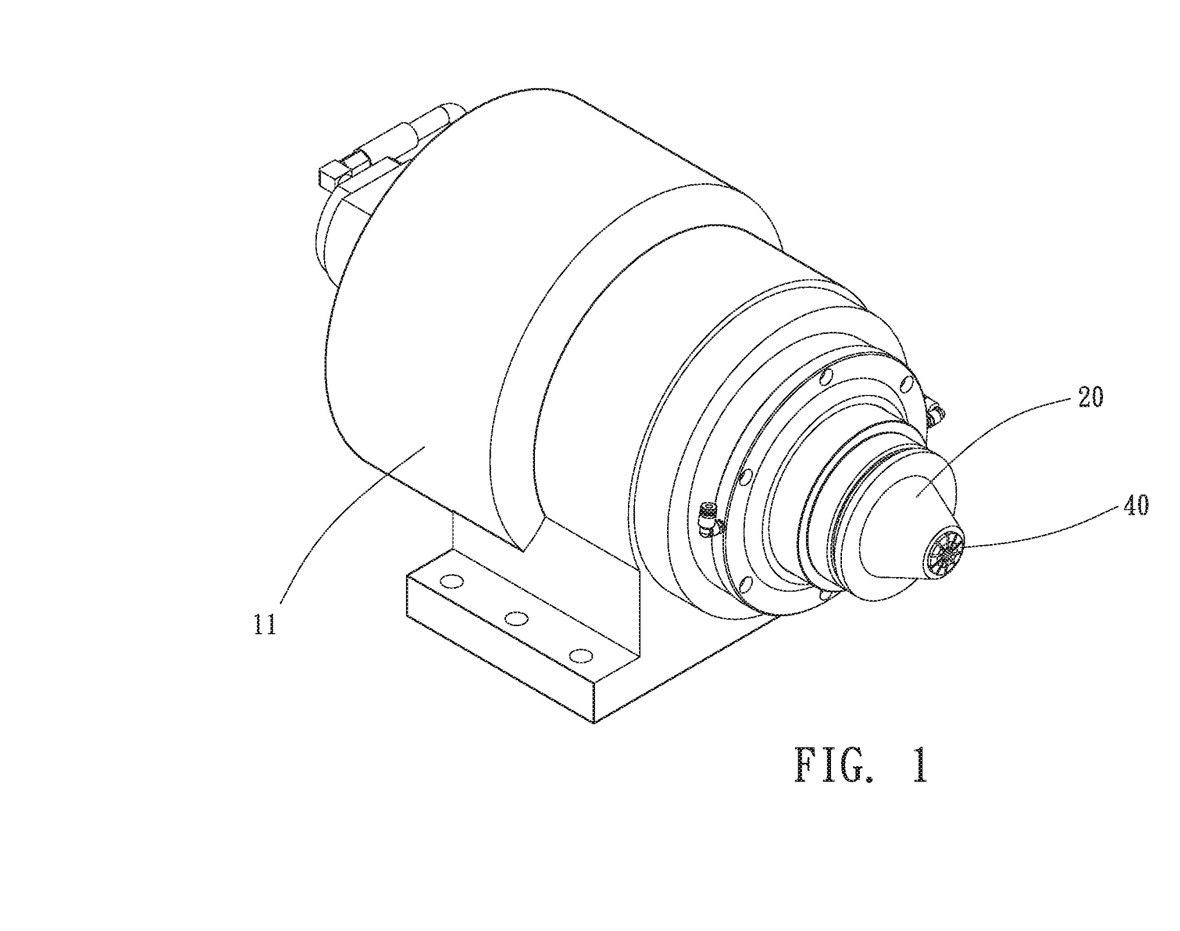
FIG. 1 is a stereogram showing a gripper module of the present invention.
Figure 2:
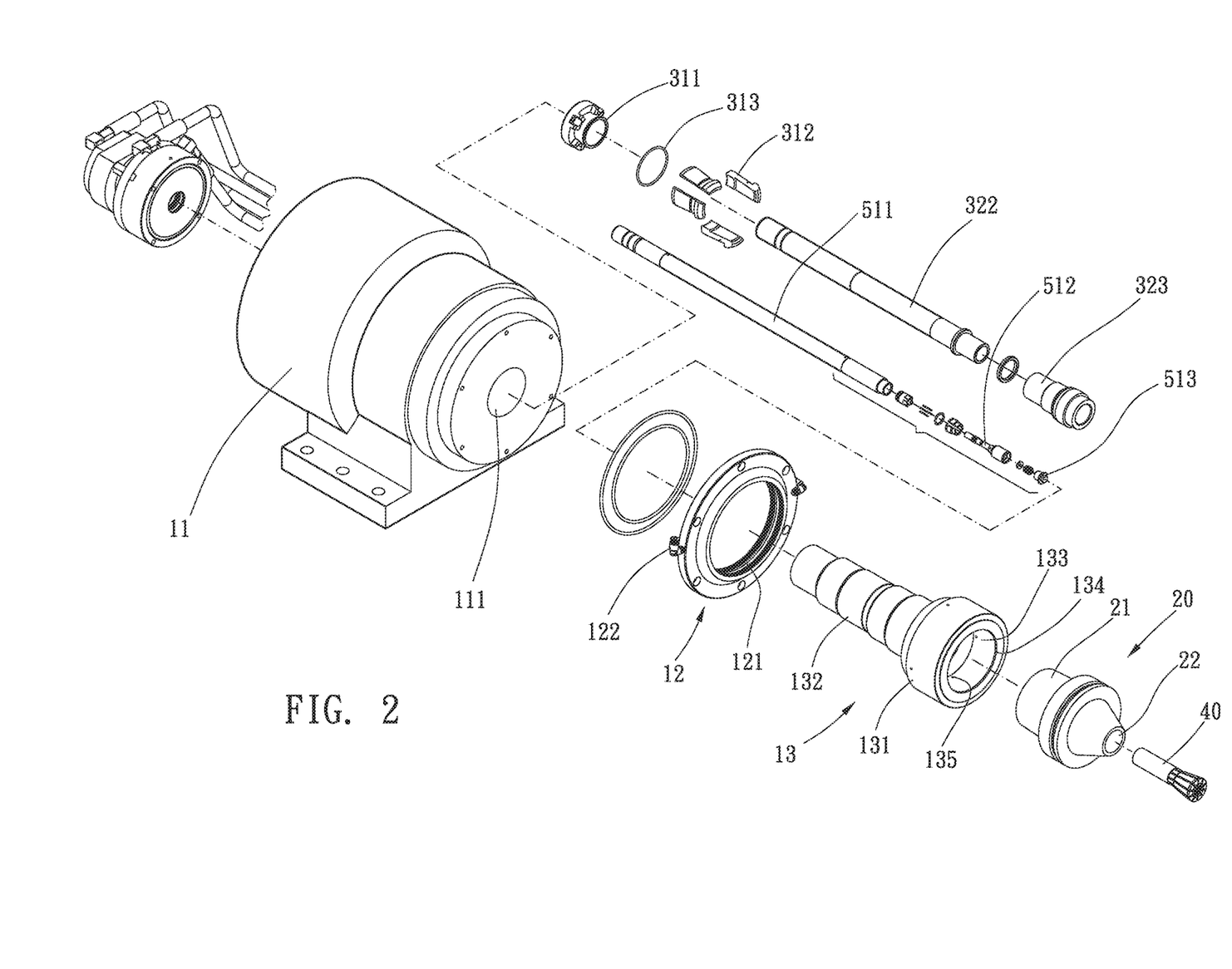
FIG. 2 is a breakdown drawing showing a gripper module of the present invention.

Pleaser refer to FIG. 2, the base includes a seat 11, a gas-providing ring 12, and a mounting cylinder 13. The seat 11 can be installed in a processing machine so that the gripper module can be installed in the processing machine. The seat 11 has a through hole 111 at a center thereof wherein the through hole 111 extends horizontally. The gas-providing ring 12 is disposed on the seat 11 and surrounds the through hole 111. The gas-providing ring 12 has an annular groove 121 on an inner peripheral face thereof. At least one gas-providing connector 122 is disposed on an outer peripheral face of the gas-providing ring 12. The gas-providing connector 122 communicates the annular groove 121. The gas-providing connector 122 is adapted for connecting to a pressured gas source, and the gas further enters the annular groove 121 via the gas-providing connector 122. The mounting cylinder 13 has a head portion 131 having a larger diameter and a body portion 132 having a smaller diameter. The head portion 131 encloses a receiving room 133 and an opening 134 at a center thereof. The receiving room 133 is substantially cylinder-shaped and defines an axis. An opening direction is defined as a direction from the receiving room 133 toward the opening 134. The receiving room 133 has a conical lateral wall, and a diameter of the receiving room 133 is increasing along the opening direction. The head portion 131 has a plurality of gas holes 135 formed on a peripheral face thereof. Each of the gas holes 135 radially penetrates the head portion 131 and is connected to the lateral wall of the receiving room 133. The body portion 132 is tube-shaped and has an aperture communicating the receiving room 133. The head portion 131 is inserted through the gas-providing ring 12, and the body portion 132 is inserted into and fixed to the through hole 111. The annular groove 121 of the gas-providing ring 12 corresponds to the gas holes 135 positionally so that the gas-providing connector 122, the annular groove 121, and the gas holes 135 communicate to each other to form a first jetting channel. The first jetting channel is adapted for being injected with gas to jet out the gas toward the lateral wall of the receiving room 133.

Figure 3:
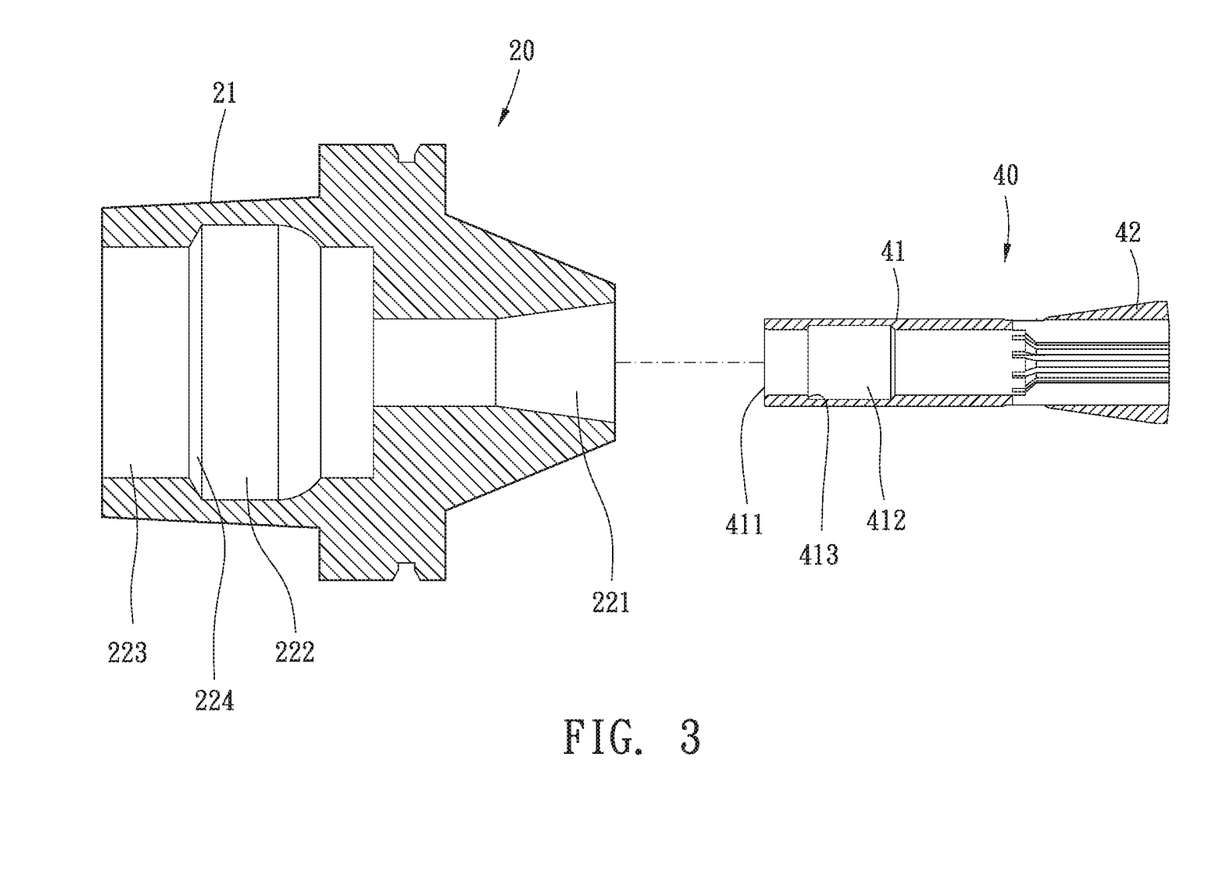
FIG. 3 is a profile showing a collet and a holder for the present invention.
Figure 4:
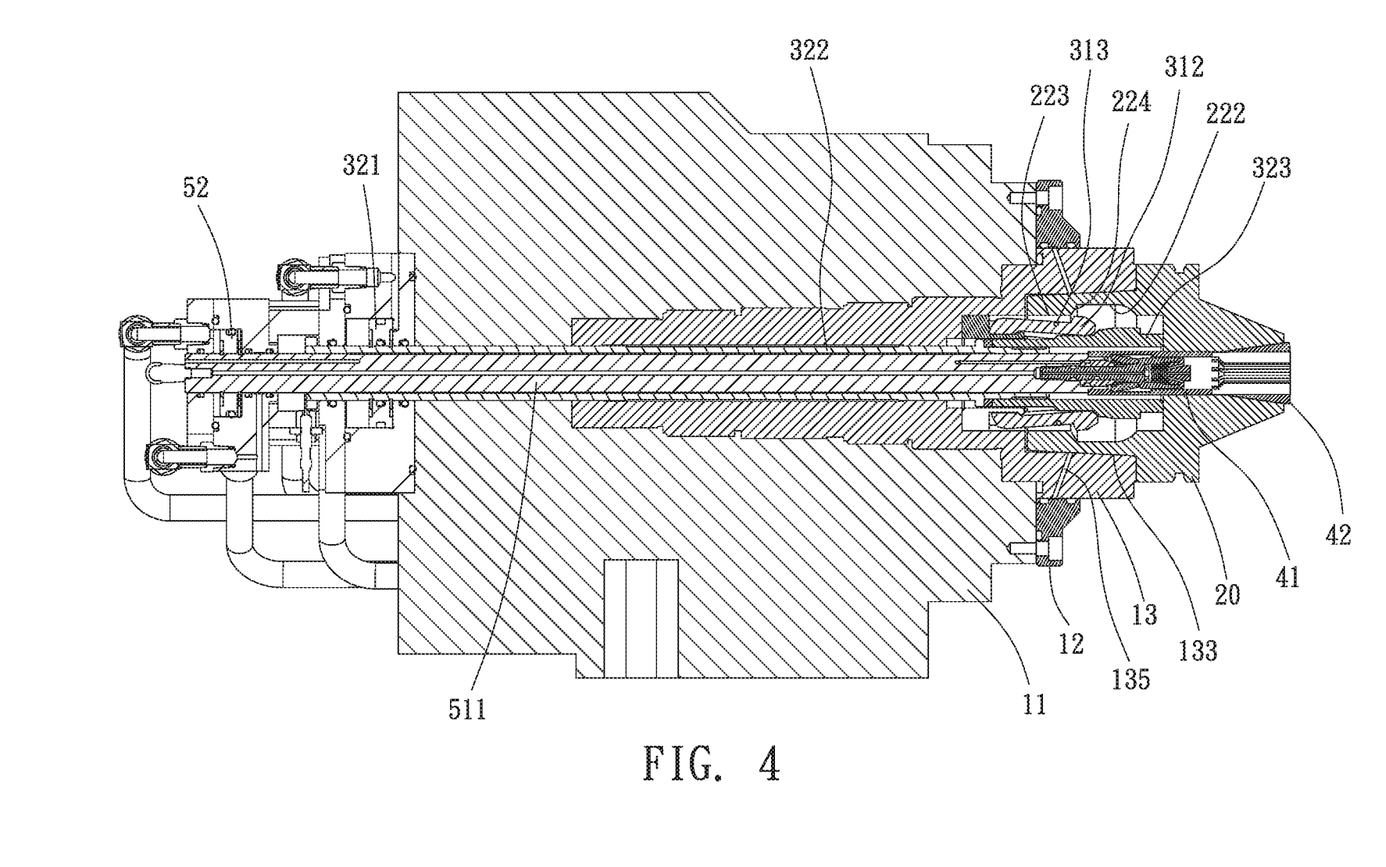
FIG. 4 is a profile showing gripper module of the present invention.
Figure 5:
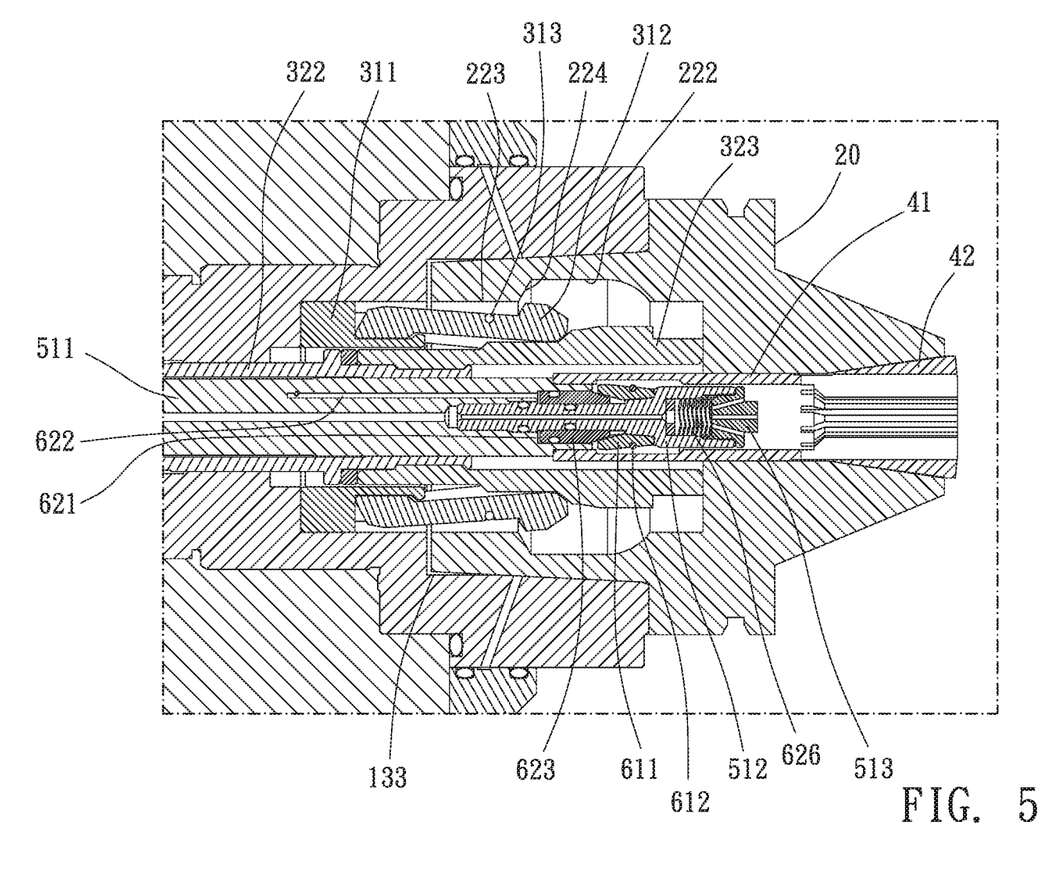
FIG. 5 is a partial enlargement of FIG. 4.
Figure 6:
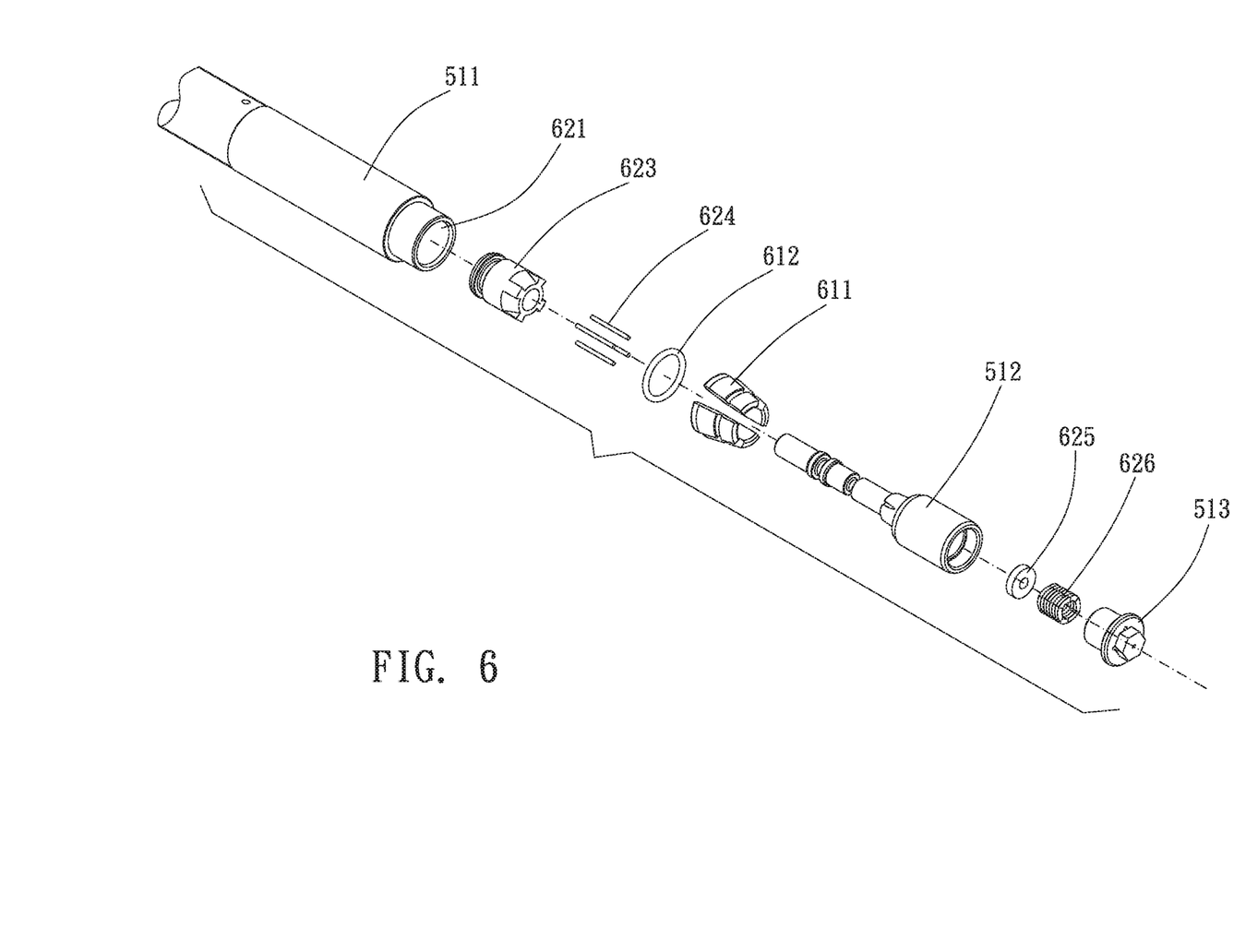
FIG. 6 is a partial enlargement of FIG. 2.

Please refer to FIG. 2 and FIG. 3, the adapter 20 has a connecting portion 21 and an axial hole 22. The connecting portion 21 has an outer peripheral surface which is conical and has a size corresponding to the receiving room 133 so that connecting portion 21 is detachably inserted into the receiving room 133. The axial hole 22 penetrates the adapter 20. The axial hole 22 is partitioned into a sleeve portion 221, a large diameter section 222, and a small diameter 223 by shape. The sleeve portion 221 forms a conical hole expending along the opening direction. The large diameter section 222 is located between the sleeve portion 221 and the small diameter section 223. The large diameter section 222 has a larger inner diameter than an inner diameter of the small diameter section 223, and an abutting face 224 is formed between the large diameter section 222 and the small diameter section 223. Preferably, the abutting face 224 is also conical.

Please refer to FIG. 2 to FIG. 5, the adapter holder includes a first jaw assembly and a first impelling assembly. The first jaw assembly includes a jaw seat 311, a plurality of jaw members 312, and an elastic ring 313. The jaw seat 311 is received in the receiving room 133. The jaw members 312 are received in the receiving room 133 and are arranged annularly around the axis. A rear end of each of the jaw members 312 is pivotably disposed on the jaw seat 311 so that a front end of each of the jaw members 312 is swayable toward the axis or away from the axis. Please refer to FIG. 5, the jaw member 312 has a buckle portion at the front end thereof wherein the buckle portion is protruded radially. When the adapter 20 is inserted into the receiving room 133, the buckle portion corresponds to the large diameter section 222 and the abutting face 224. The elastic ring 313 can be a rubber ring, C-shaped elastic plate, or an annular spring. The elastic ring 313 surrounds the jaw members 312 to fasten the jaw members 312. Due to the elastic force provided by the elastic ring 313, the jaw members 312 tend to move toward the axis. Please refer to FIG. 2 and FIG. 5, the first impelling assembly includes a hydraulic actuating unit 321, a connecting tube 322, and a first moving portion 323. The hydraulic actuating unit 321 can be a hydraulic cylinder and its flowing channels, and can be driven to moved by a hydraulic source. The connecting tube 322 connects the hydraulic unit 321 and the first moving portion 323 therebetween so that the connecting tube 322 and the first moving portion 323 can be driven to move together by the hydraulic actuating unit 321. The first moving portion 323 is located between each of the jaw members 312 and the axis. The first moving portion 323 has an abutting portion protruded radially to abut against the front end of the jaw member 312 when moving along the axis so that the front end of the jaw member 312 sways away from the axis.

The collet 40 has an extension portion 41 and a plurality of gripping jaws 42 axially extending from the extension portion 42. The extension portion 41 has a connecting hole 411, an annular positioning groove 412, and a stepped abutting face 413. The connecting hole 411 extends along the axis and penetrates the collet 40. The annular positioning groove 412 is recessedly formed on an inner face of the connecting hole 411. The stepped abutting face 413 is formed at a rear end of the annular positioning groove 412. The gripping jaws 42 are arranged annularly, and a gripping opening is formed among the gripping jaws 42. The gripping opening communicates the connecting hole 411 and is adapted for receiving a workpiece. The outer contour of the gripping jaws 42 is conical, and a size and a shape thereof correspond to those of the sleeve portion 221 of the adapter 20.

The actuator includes an axial rod and a hydraulic actuating unit 52. The axial rod includes a first rod 511, a second rod 512, and a gas nozzle 513 connected along the axis. The second rod 512 is located between the first rod 511 and the gas nozzle 513. The axial rod is inserted through the through hole 111 of the seat 11, the aperture of the body portion 132 of the mounting cylinder 13, the receiving room 133, and the connecting tube 322. Gas holes extending along the axis are formed at centers of the first rod 511 and the second rod 512, and the gas nozzle 513 has a plurality of jetting holes penetrating therethrough. The gas holes of the first rod 511 and the second rod 512 communicate each other and also communicate the jetting holes of the gas nozzle 513 to form a second jetting channel for being injected with pressured gas and jetting out the gas. The hydraulic actuating unit 52 is similar to the hydraulic actuating unit 321 of the adapted holder and can be a hydraulic cylinder and its flowing channels. The hydraulic actuating unit 52 is connected to the axial rod to drive the axial rod to move along the axis by hydraulic source.

Please refer to FIG. 2 to FIG. 6, the collet holder includes a second jaw assembly and a second impelling assembly. The second jaw assembly includes a plurality of jaw members 611 and an elastic ring 612. The jaw members 611 are annular arranged around the second rod 512 of the axial rod. The elastic ring can be a rubber ring, a C-shaped elastic plate, or an annular spring to surround the jaw members 611 to fasten the jaw members 611. The jaw members 611 tend to move toward the axis due to the elastic force provided by the elastic ring 612. The second actuating assembly includes a hydraulic groove 621, a hydraulic channel 622, a second moving portion 623, rods 624, a blocking plate 625, and a restoration device 626. The hydraulic groove 621 is formed between the first rod 511 and the second rod 512. The hydraulic channel 622 communicates the hydraulic groove 621. The second moving portion 623 is slidably arranged in the hydraulic groove 621. The hydraulic channel 622 is adapted for connecting to a hydraulic source, and liquid can be injected into the hydraulic groove 621 via the hydraulic channel 622. Thereby, the second moving portion 623 is driven to move forward to abut against the jaw members 611 so that the rear ends of the jaw members 611 sway away from the axis to open. The rods 624 are inserted through the second rod 512. The front ends of the rods 624 abut against the blocking plate 625, and the rear ends abut against the second moving portion 623. The restoration device 626 can include one or a plurality of elastic members biased between the gas nozzle 513 and the blocking plate 625 to provide elastic force to the second moving portion 623 via the blocking plate 625 and the rods 624 so that the second moving portion 623 tends to move backward.

Figure 7:
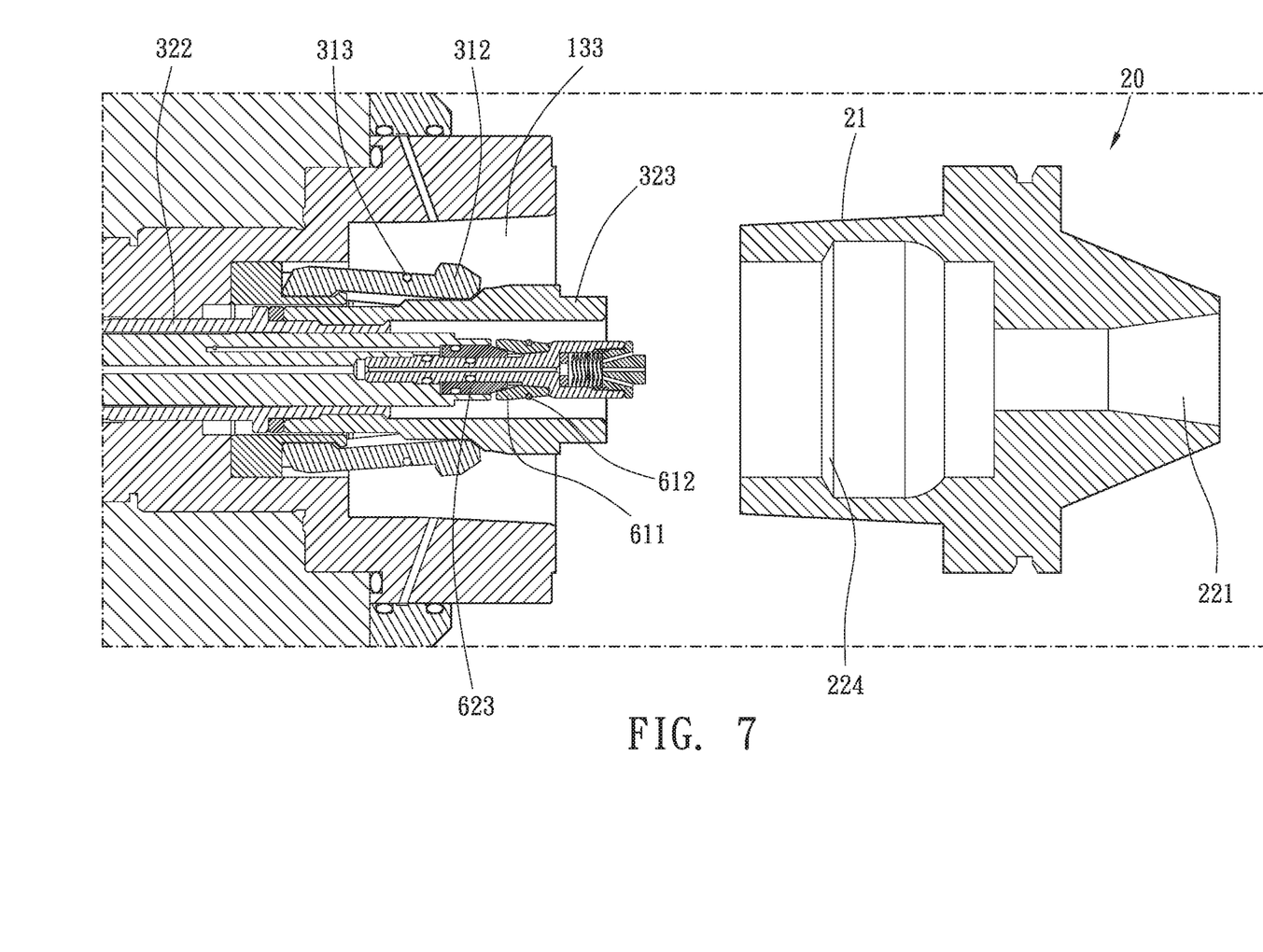
FIG. 7 to FIG. 9 are illustrations showing a consecutive motion of a gripper module of the present invention.

In use, when replacing or assembling the adapter and the collet as shown in FIG. 7, the first moving portion 323 is located at the first original position and does not abut against the first jaw assembly, and the second moving portion 623 is located at the second original position and does not abut against the second jaw assembly. The jaw members 312 of the first jaw assembly are fastened by the elastic ring 313 toward the axis, and the jaw members 611 of the second jaw assembly are fastened by the elastic ring 612 toward the axis. The connecting portion 21 of the adapter can be inserted into the receiving room 133 easily.

Figure 8:
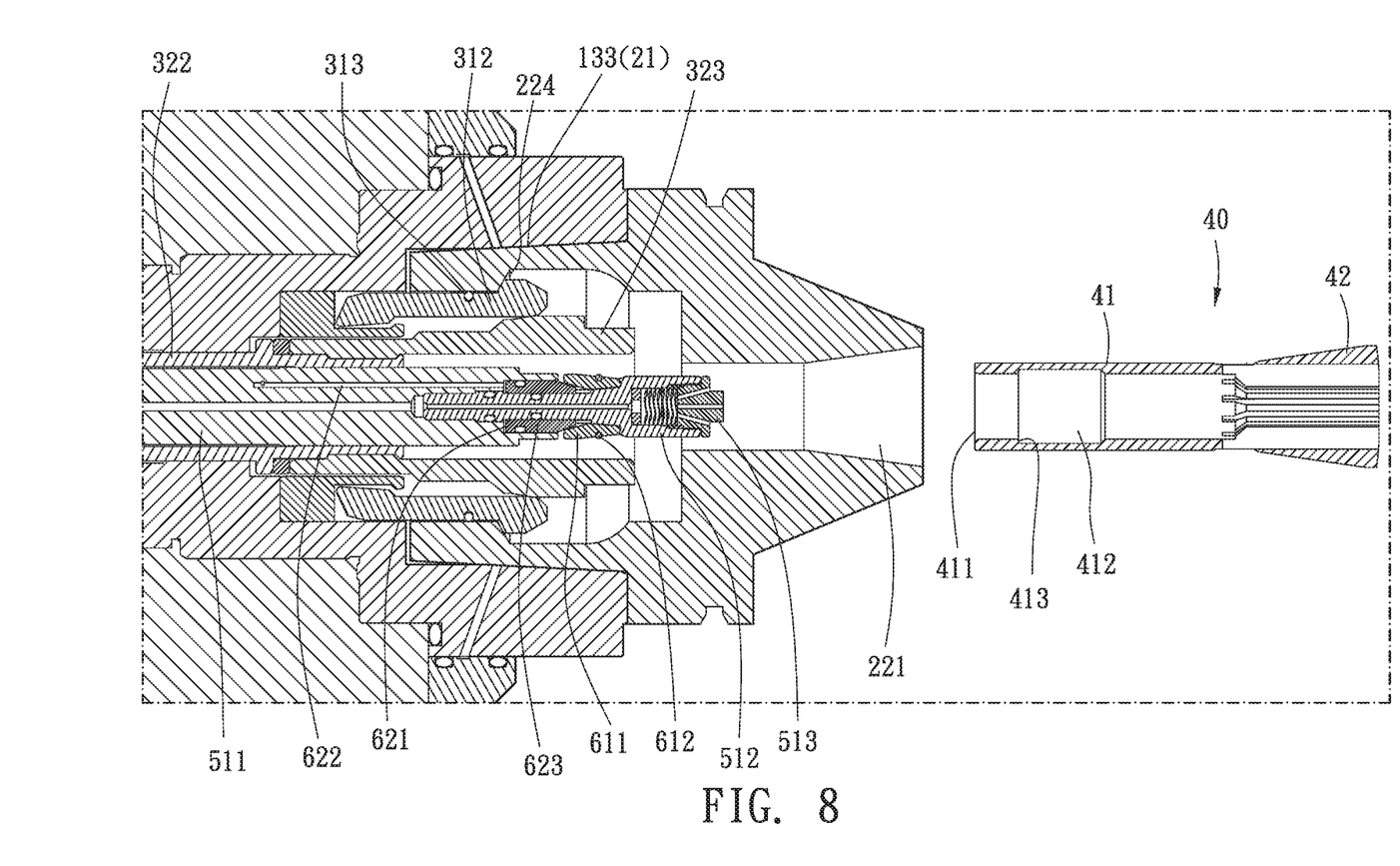

Please refer to FIG. 7 and FIG. 8, when the connecting portion 21 is inserted in the receiving room 133, the adapter can be precisely and firmly positioned to the axis because the corresponding conical surfaces of the connecting portion 21 and the receiving room 133. When the first impelling assembly of the adapted holder is triggered to allow the hydraulic source to provide hydraulic power to the hydraulic actuating unit, the connecting tube 322 and the first moving portion 323 are driven to move backward so that the first moving portion 323 is moved to the first buckle position, as shown in FIG. 8. The first moving portion 323 pushes the front end of the jaw members 312 to make them sway away from the axis so that the jaw members 312 radially buckles to the abutting face 224 of the adapter outward to position the adapter. Specifically, due to the conical abutting face 224, a backward component of force is provided when the jaw members 312 buckle to the abutting face 224 so that the adapter is firmly positioned in the receiving room 133.

Figure 9:
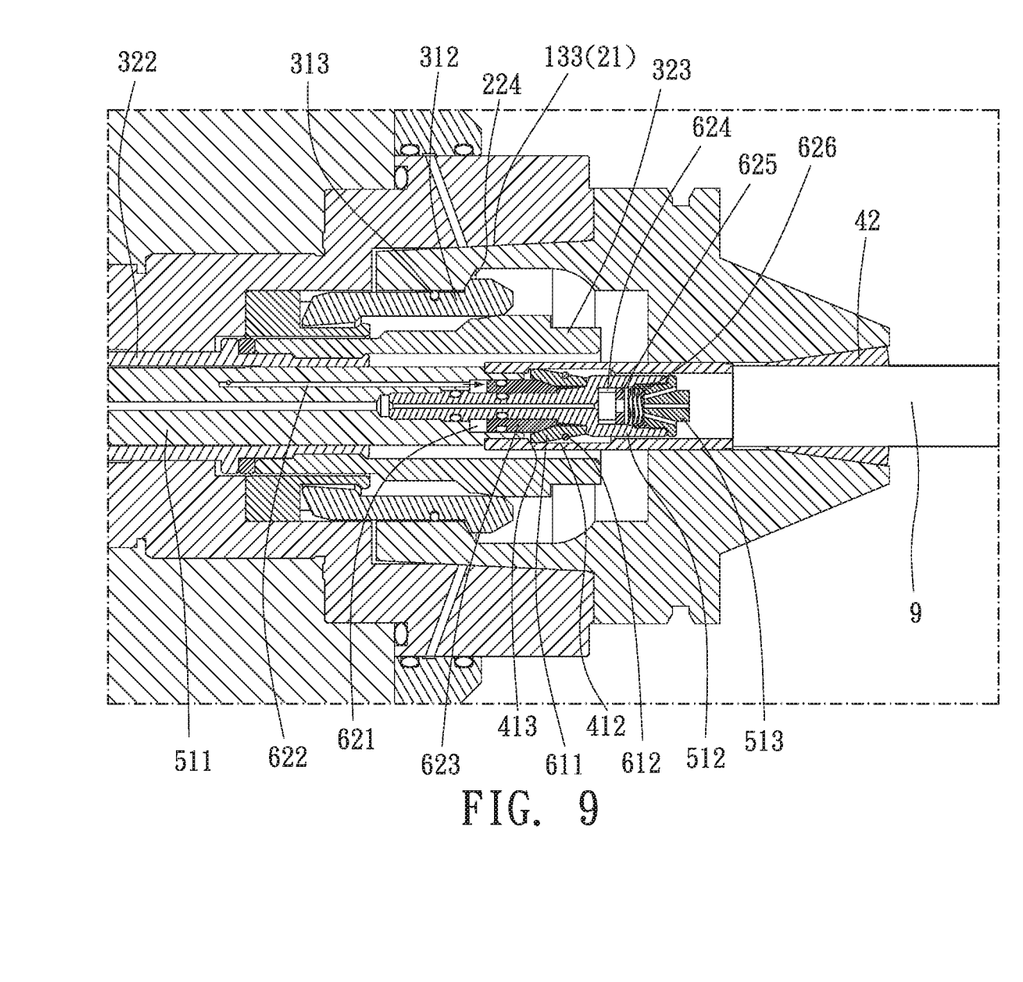

Thereafter, insert the extension portion 41 of the collet into the sleeve portion 221 and the receiving room 133. The extension portion 41 is connected to the gas nozzle 513, the second rod 512, the jaw members 611, and the second moving portion 623 via the connecting hole 411, and abuts against the first rod 511. Due to the corresponding conical surfaces of the gripping jaw 42 and the sleeve portion 221, the collet can be precisely and firmly positioned to the axis. And then, trigger the second impelling assembly of the collet holder to allow the hydraulic source to provide hydraulic power to the hydraulic channel 622 and the hydraulic groove 621 so that the second moving portion 623 is moved forward from the second original position shown in FIG. 8 to the second buckle position shown in FIG. 9. The second moving portion 623 pushes the rear ends of the jaw members 611 to make them sway away from the axis so that the jaw members 611 radially buckle to the annular positioning groove 412 and the stepped abutting face 413 outward to position the collet.

When the collet is inserted into the sleeve portion 221 or the collet is positioned to the sleeve portion 221, the workpiece 9 can be further inserted into the clamping opening enclosed by the gripping jaw 42, and then trigger the hydraulic actuating unit of the actuator to allow the hydraulic source to provide power to the hydraulic actuating unit. Thereby, the first rod 511 and the second rod 512 are driven to move backward, and the jaw members 611 and collet are also driven to move together so that the collet moves backward with respect to the adapter. Due to the corresponding conical surfaces of the gripping jaw 42 and the sleeve portion 221, the gripping jaw 42 is fastened toward the clamping opening so as to position the workpiece 9.

To detach the workpiece, the hydraulic actuating unit is provided with hydraulic power by the hydraulic source to drive the actuator reversely so that the first rod 511 and the second rod 512 are moved forward. And then, connect the second jetting channel with the pressured gas source to jet out gas into the connecting hole and the clamping opening of the collet via the second jetting channel so that the workpiece 9 can be removed.

To detach the collet, release the hydraulic source connected to the hydraulic channel 622 so that the second moving portion is moved back to the second original position by the elastic force provided by the restoration device 626. Thus, the jaw members 611 are fastened toward the axis by the elastic ring so that the jaw members 611 leaves the annular positioning groove 412 and the stepped abutting face 413. Thereby, the collet can be removed along the opening direction.

To detach the adapter, the hydraulic source provides hydraulic power to the adapted holder to reversely actuate the connecting tube 322 and the first moving portion 323 so that the jaw members 312 sway toward the axis due to the elastic ring 313. Thus, the jaw members 312 are separated from the abutting face 224, and the adapter can be removed along the opening direction. Furthermore, when the first jetting channel is connected with the pressured gas source, the gas is injected into the receiving room via the gas holes 135 so that the adapter can be removed easier.

Therefore, the axial rod can be driven to move to selectively hold or release the workpiece by only actuating the actuator. Or, the collet can be held or released selectively for removing both the collet and the workpiece by actuating the collet holder. When the workpiece to hold is larger or smaller, the user can actuate the adapter holder to selectively hold or release the adapter so that the adapter and the collet can be removed together. Thereby, the gripper module is suitable for workpieces in various sizes.

Besides, the adapter and the base abut against each other via the conical surfaces, so the adapter can be well aligned to the axis precisely. Thus, other calibrations can be ignored. As a result, the efficiency of replacement and assembling is improved, and the precision is ensured because manual calibration is not necessary anymore.

Figure 10:
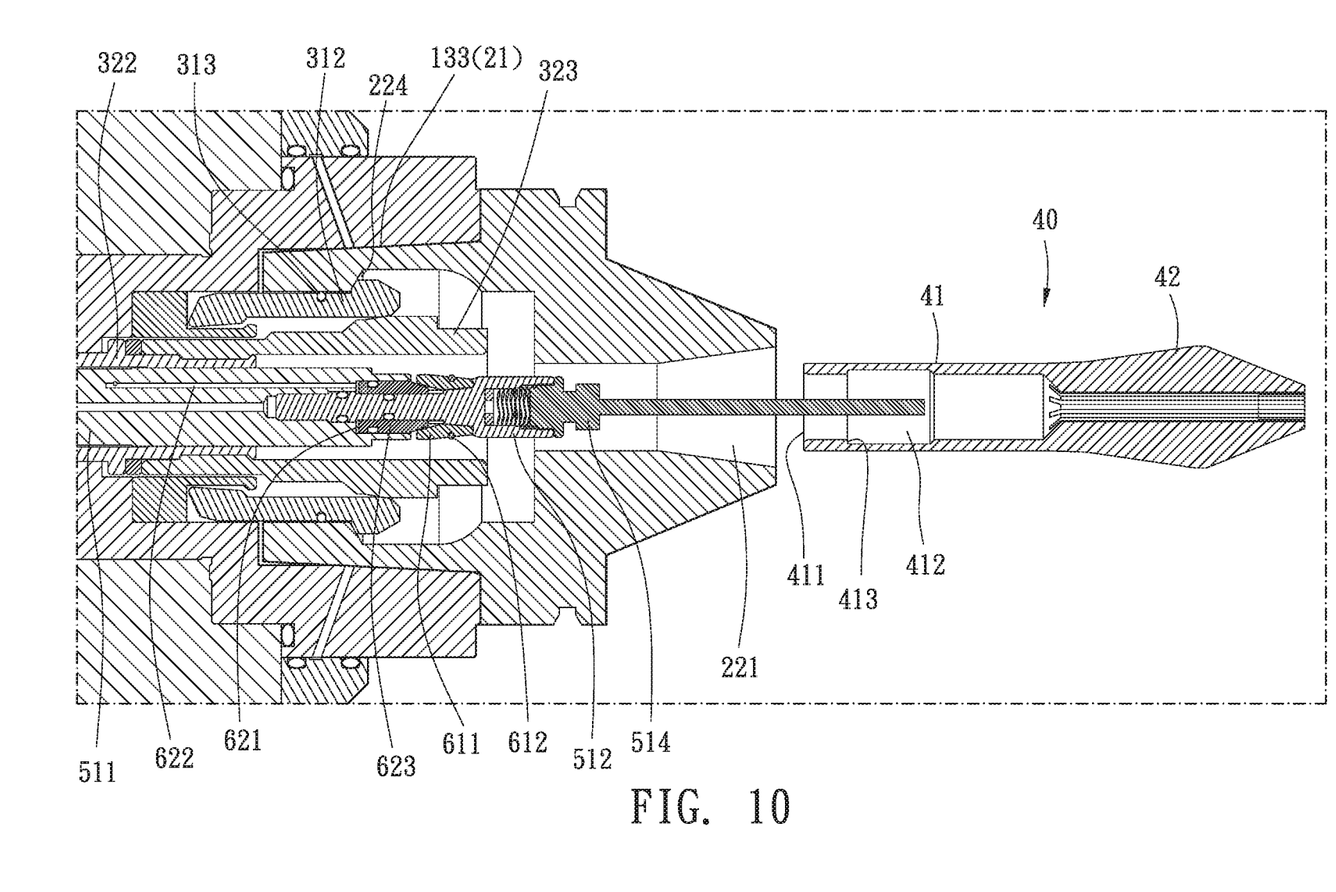
FIG. 10 is a partial enlargement of profile showing a gripper module of a second embodiment of the present invention.

Please refer to FIG. 10 of the second embodiment of the present invention. In this embodiment, the second rod 512 is solid and has no gas hole, and the gas nozzle is replaced with a pushing rod 514 extending along the axis. The pushing rod 514 is disposed on the second rod 512. The second rod 512 can be driven to move forward by injecting liquid via the hole at the center of the first rod 511. The pushing rod 514 is used to push the workpiece. Thus, the pushing rod 514 can be used to position the workpiece, and also to push the workpiece out while replacing the workpiece.

In conclusion, the gripper module of the present invention is suitable for workpieces in various sizes and is easy to remove, to replace, and to position. In addition, the precision of rotation is improved so that efficiency and precision of processing are improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A gripper module, adapted for an adapter and a collet to connect with, the collet being adapted for clamping a workpiece, the adapter having an axial hole, the collet being detachably inserted into the axial hole, the collect enclosing a clamping opening, the gripper module including:
   a base, having a receiving room, the receiving room having an opening, the receiving room defining an axis and an opening direction, the receiving room being adapted for the adapter to detachably insert into via the opening, the axial hole expanding along the opening direction when the adapter is inserted into the receiving room;
   an adapter holder, received in the receiving room, holding the adapter selectively so that the adapter is positioned in the receiving room;
   a collet holder, received in the receiving room, holding the collet so that the collet is positioned in the axial hole;
   an actuator, disposed on the base and connected to the collet holder, the actuator driving the collet holder to move along a direction opposite to the opening direction so as to drive the collet to move along a direction opposite to the opening direction and to fasten the collet into the clamping opening due to the axial hole.

2. The gripper module of claim 1, wherein the receiving room has a lateral wall which is conical so that a diameter of the receiving room is increasing along the opening direction.

3. The gripper module of claim 2, further including a first jetting device, the first jetting device including a first jetting channel, the first jetting channel being connected to the lateral wall, the first jetting channel being adapted for connecting to a gas-providing device so as to jet out gas to the lateral wall via the first jetting channel.

4. The gripper module of claim 1, wherein the adapter holder includes a first jaw assembly and a first impelling assembly, the first jaw assembly is received in the receiving room and is arranged around the axis, the first impelling assembly includes a first moving portion, the first moving portion is adapted for being driven to move along the axis between a first original position and a first buckle position, the first moving portion pushes the first jaw assembly when moving from the first original position to the first buckle position so that the first jaw assembly is expanded away from the axis to buckle to the adapter.

5. The gripper module of claim 4, wherein the first jaw assembly includes a plurality of jaw members and an elastic ring, the jaw members are arranged around the axis, the elastic ring is arranged around the jaw members, the elastic ring provides an elastic force to the jaw members to urge the jaw members to move toward the axis.

6. The gripper module of claim 4, wherein the collet holder includes a second jaw assembly and a second impelling assembly, the second jaw assembly is received in the receiving room and is arranged around the axis, the second impelling assembly includes a second moving portion, the second moving portion is adapted for being driven to move along the axis between a second original position and a second buckle position, the second moving portion pushes the second jaw assembly when moving from the second original position to the second buckle position so that the second jaw assembly is expanded away from the axis to buckle to the collet.

7. The gripper module of claim 6, wherein the actuator includes an axial rod, the second impelling assembly includes a hydraulic groove, a hydraulic channel, and a restoration device, the hydraulic groove is formed on the axial rod, the second moving portion is slidably disposed in the hydraulic groove, the hydraulic channel communicates the hydraulic groove, the hydraulic channel is adapted for being injected with liquid to drive the second moving portion to move toward the second buckle position, the restoration device provides an elastic force to the second moving portion so that the second moving portion tends to move toward the second original position.

8. The gripper module of claim 7, wherein the first impelling assembly includes a connecting tube, the connecting tube extends along the axis, the first moving portion is disposed on the connecting tube, the axial rod is movably inserted into the connecting tube.

9. The gripper module of claim 1, wherein the collet holder includes a second jaw assembly and a second impelling assembly, the second jaw assembly is received in the receiving room and is arranged around the axis, the second impelling assembly includes a second moving portion, the second moving portion is adapted for being driven to move along the axis between a second original position and a second buckle position, the second moving portion pushes the second jaw assembly when moving from the second original position to the second buckle position so that the second jaw assembly is expanded away from the axis to buckle to the collet.

10. The gripper module of claim 9, wherein the actuator includes an axial rod, the second impelling assembly includes a hydraulic groove, a hydraulic channel, and a restoration device, the hydraulic groove is formed on the axial rod, the second moving portion is slidably disposed in the hydraulic groove, the hydraulic channel communicates the hydraulic groove, the hydraulic channel is adapted for being injected with liquid to drive the second moving portion to move toward the second buckle position, the restoration device provides an elastic force to the second moving portion so that the second moving portion tends to move toward the second original position.

* * * * *